United States Patent
Mulligan (10) Patent No.: US 9,327,783 B1
(45) Date of Patent: May 3, 2016

(54) CARTRIDGE JOINT WITH CONVOLUTED SEAL

(71) Applicant: Deere & Company, Moline, IL (US)

(72) Inventor: Patrick J. Mulligan, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 422 days.

(21) Appl. No.: 13/888,860

(22) Filed: May 7, 2013

(51) Int. Cl.
*B62D 55/15* (2006.01)
*B62D 55/088* (2006.01)

(52) U.S. Cl.
CPC ............ *B62D 55/15* (2013.01); *B62D 55/0887* (2013.01)

(58) Field of Classification Search
CPC .. B62D 55/15; B62D 55/0887; B62D 55/092; B62D 55/21; B62D 55/213
USPC ......................................................... 277/371
See application file for complete search history.

(56) References Cited

U.S. PATENT DOCUMENTS

| | | | |
|---|---|---|---|
| 2,179,875 A * | 11/1939 | Baker et al. | 384/368 |
| 2,237,921 A * | 4/1941 | Baker et al. | 384/381 |
| 3,469,891 A | 9/1969 | Deli | |
| 3,492,054 A | 1/1970 | Boggs et al. | |
| 3,606,497 A | 9/1971 | Gilles | |
| 3,762,778 A | 10/1973 | Boggs et al. | |
| 3,767,214 A * | 10/1973 | Kawamura | 277/358 |
| 3,909,076 A * | 9/1975 | Kato | 305/104 |
| 4,112,574 A * | 9/1978 | Deli | 29/527.1 |
| RE30,039 E | 6/1979 | Clemens et al. | |
| 4,199,199 A | 4/1980 | Granda | |
| 4,237,998 A | 12/1980 | Matayoshi | |
| 4,244,588 A | 1/1981 | Langewisch | |
| 4,246,689 A * | 1/1981 | Deli | 29/436 |
| 4,251,182 A * | 2/1981 | Schroeder | 414/723 |
| 4,311,346 A * | 1/1982 | Danner | 305/103 |
| 4,438,981 A * | 3/1984 | Harms | 305/118 |
| 4,560,174 A | 12/1985 | Bisi | |
| 4,818,041 A | 4/1989 | Oertley | |
| 4,840,438 A | 6/1989 | Cory | |
| 5,069,509 A | 12/1991 | Johnson et al. | |
| 5,183,318 A | 2/1993 | Taft et al. | |
| 5,511,869 A | 4/1996 | Edwards et al. | |
| 6,206,491 B1 | 3/2001 | Hisamatsu | |
| 6,371,577 B1 | 4/2002 | Hasselbusch et al. | |
| 6,382,742 B1 | 5/2002 | Hasselbusch et al. | |
| 6,454,366 B1 | 9/2002 | Egle | |

(Continued)

FOREIGN PATENT DOCUMENTS

| | | | |
|---|---|---|---|
| DE | 3419113 A | * 11/1985 | |
| EP | 0860352 A2 | 8/1998 | |

(Continued)

OTHER PUBLICATIONS

Background Information (1 page)(admitted prior art).

(Continued)

*Primary Examiner* — Kip T Kotter (57) ABSTRACT

A cartridge joint comprises a pin, a first collar circumferentially surrounding the pin and fixed thereto, a second collar circumferentially surrounding the pin and fixed thereto, and a bushing positioned axially between the first collar and the second collar and circumferentially surrounding the pin for relative rotation between the bushing and the pin. The cartridge joint has an annular first seal unit and an annular second seal unit. A method of assembling a cartridge joint is disclosed.

14 Claims, 6 Drawing Sheets

(56) References Cited

U.S. PATENT DOCUMENTS

| | | |
|---|---|---|
| 6,739,680 B2 | 5/2004 | Hasselbusch et al. |
| 6,783,129 B2 | 8/2004 | Akita et al. |
| 6,874,859 B1 * | 4/2005 | Duse ............................ 305/136 |
| 7,240,973 B2 | 7/2007 | Takayama |
| 7,347,513 B2 | 3/2008 | Johannsen et al. |
| 7,597,410 B2 | 10/2009 | Mulligan et al. |
| 7,744,169 B2 | 6/2010 | Murakami et al. |
| 7,766,433 B2 | 8/2010 | Mulligan et al. |
| 7,850,256 B2 | 12/2010 | Mulligan |
| 8,070,241 B2 | 12/2011 | Mulligan |
| 2003/0219181 A1 | 11/2003 | Hashimoto et al. |
| 2004/0114993 A1 | 6/2004 | Anderton et al. |
| 2004/0228676 A1 | 11/2004 | Oertley |
| 2006/0251349 A1 | 11/2006 | Ditz et al. |
| 2009/0102281 A1 | 4/2009 | Clarke et al. |
| 2010/0090523 A1 * | 4/2010 | Grenzi ........................ 305/104 |
| 2012/0161509 A1 * | 6/2012 | Kupper ........................ 305/100 |
| 2013/0092459 A1 | 4/2013 | Wodrich et al. |

FOREIGN PATENT DOCUMENTS

| | | |
|---|---|---|
| EP | 1391371 A1 | 2/2004 |
| WO | 8100545 A1 | 5/1981 |
| WO | 8908577 A1 | 9/1989 |
| WO | 2008093160 A1 | 8/2008 |

OTHER PUBLICATIONS

Image of Constant Velocity Boot available on http://lovehorsepower.com/joomla/index.php?option=com_content&view=article&id=46&Itemid=62 (1 page)(Jan. 1, 2011).
Case Extended Life Track information (1 page)(admitted prior art).
Caterpillar SystemOne™ Undercarriage Information (7 pages)(admitted prior art).
Deere 700K/750K/850K Dozers Product Brochure (28 pages)(Oct. 2012).
Drawings of Prior Systems (2 pages)(admitted prior art).
Track Joint Seal of Deere 850J Crawler (1 page)(admitted prior art).
Caterpillar Bogie Assembly (3 pages)(admitted prior art).

* cited by examiner

CARTRIDGE JOINT WITH CONVOLUTED SEAL

FIELD OF THE DISCLOSURE

The present disclosure relates to a cartridge joint for use with relatively rotatable components.

BACKGROUND OF THE DISCLOSURE

A track vehicle (crawler dozer, crawler loader, track excavator, etc.) has an undercarriage with one or more track units on either side of the vehicle. Each track unit has an endless track trained about a drive sprocket (e.g., at the rear), one or more idlers (e.g., one at the front), and one or more lower track rollers in contact with the low pass of the endless track extending between the front and rear of the endless track. Each roller may be mounted to and positioned under a track frame (e.g., to which the sprocket may be rotatably coupled) or a recoil frame (to which an idler may be rotatably coupled) coupled to the track frame and recoilable relative thereto in response to, for example, ground impact forces.

In larger track vehicles, track roller bogies have been used. An exemplary a track roller bogie includes a mounting arm, a pivot arm, and two lower track rollers. The mounting arm is coupled pivotally to a frame (in some cases the track frame and in other cases the recoil frame) by use of a first pivot joint allowing pivotal movement of the mounting arm relative to that frame about an axis of the first pivot joint. The roller pivot arm is coupled pivotally to the mounting arm at a second pivot joint positioned between the two rollers allowing pivotal movement of the roller pivot arm and the two rollers coupled thereto relative to the mounting arm about an axis of the second pivot joint. Such a configuration of the track roller bogie enhances the ability of the endless track to marry the contours of the ground, promoting tractive effort and thus the operational capability of the track vehicle (e.g., the dozing capability of a crawler dozer).

SUMMARY OF THE DISCLOSURE

According to an aspect of the present disclosure, a cartridge joint comprises a pin, a first collar circumferentially surrounding the pin and fixed thereto, a second collar circumferentially surrounding the pin and fixed thereto, and a bushing positioned axially between the first collar and the second collar and circumferentially surrounding the pin for relative rotation between the bushing and the pin. The cartridge joint has an annular first seal unit and an annular second seal unit, each of which circumferentially surrounds the pin. The first seal unit is positioned axially between the bushing and the first collar so as to establish a sealed connection therebetween and comprises an angularly flexible first convoluted seal contacting the bushing and the first collar. The second seal unit is positioned axially between the bushing and the second collar so as to establish a sealed connection therebetween and comprises an angularly flexible second convoluted seal contacting the bushing and the second collar. The seal units, with their convoluted seals, provide the sealing function for the cartridge joint, in a relatively cost effective manner.

According to another aspect of the present disclosure, a method of assembling a cartridge joint is disclosed. The cartridge joint comprises a pin, a bushing, a first collar, a second collar, a first seal unit, and a second seal unit. The method comprises: lodging a first end portion of an angularly flexible first convoluted seal of the first seal unit into the bushing with a first lodging device of the first seal unit and a second end portion of the first convoluted seal into the first collar, circumferentially surrounding the pin and fixed thereto, with a second lodging device of the first seal unit by reacting the second lodging device of the first seal unit against a first end face of the bushing upon installing the bushing in a position circumferentially surrounding the pin for relative rotation between the bushing and the pin, and lodging a first end portion of an angularly flexible second convoluted seal of the second seal unit into the bushing with a first lodging device of the second seal unit and a second end portion of the second convoluted seal against a second collar with a second lodging device of the second seal unit by reacting the second lodging device of the second seal unit against a second end face of the bushing upon installing the second collar in a position circumferentially surrounding the pin in fixed relation thereto such that the bushing is positioned axially between the first and second collars.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
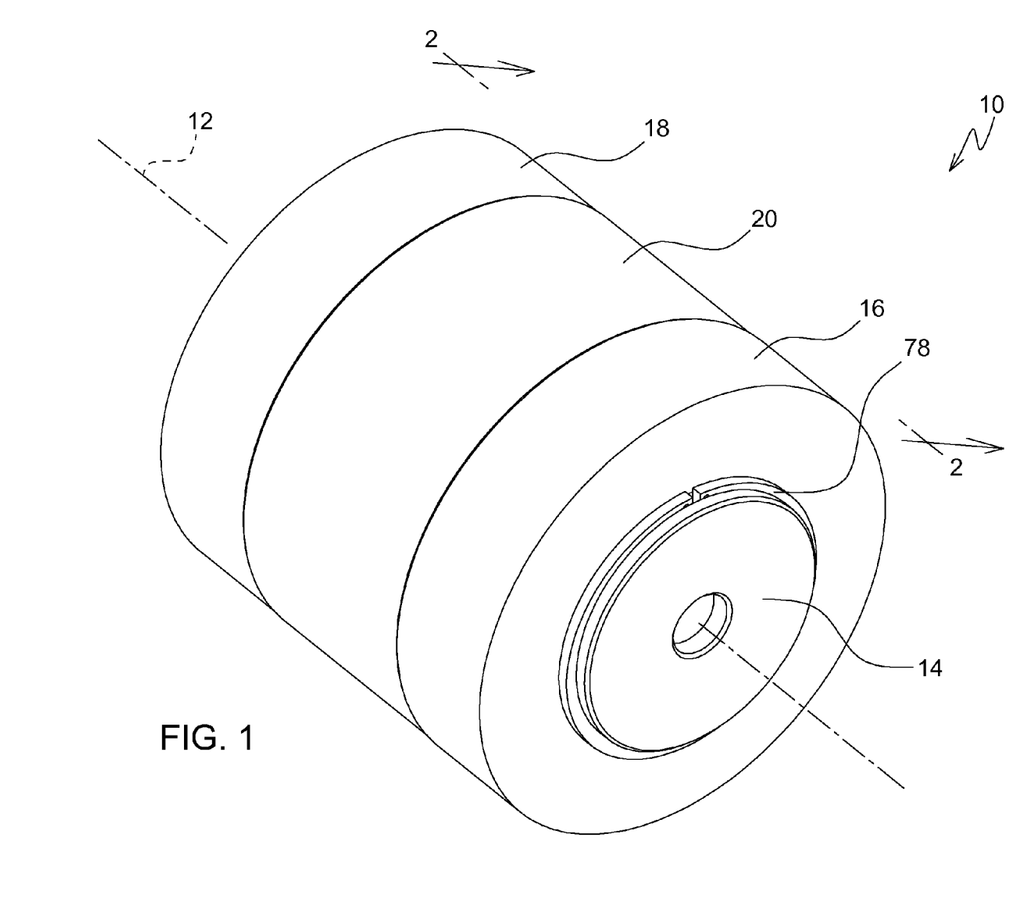
FIG. 1 is a perspective view of a cartridge joint.

Referring to FIG. 1, a cartridge joint 10 has a central axis 12. Terms herein such as axially, radially, circumferentially, angularly, and their variants are relative to the axis 12.

Figure 2:
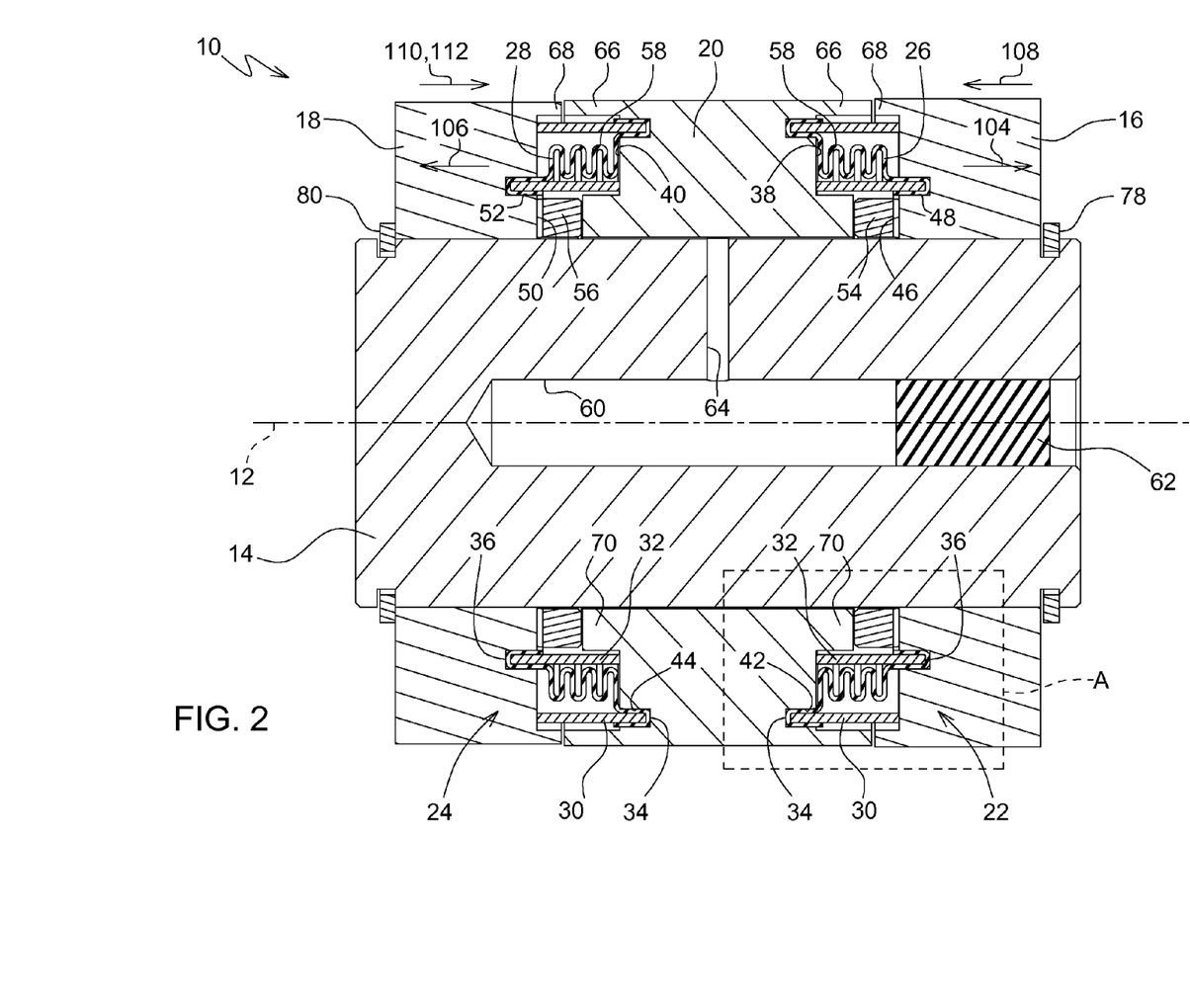
FIG. 2 is a sectional view of the cartridge joint taken along lines 2-2 of FIG. 1.
Figure 3:
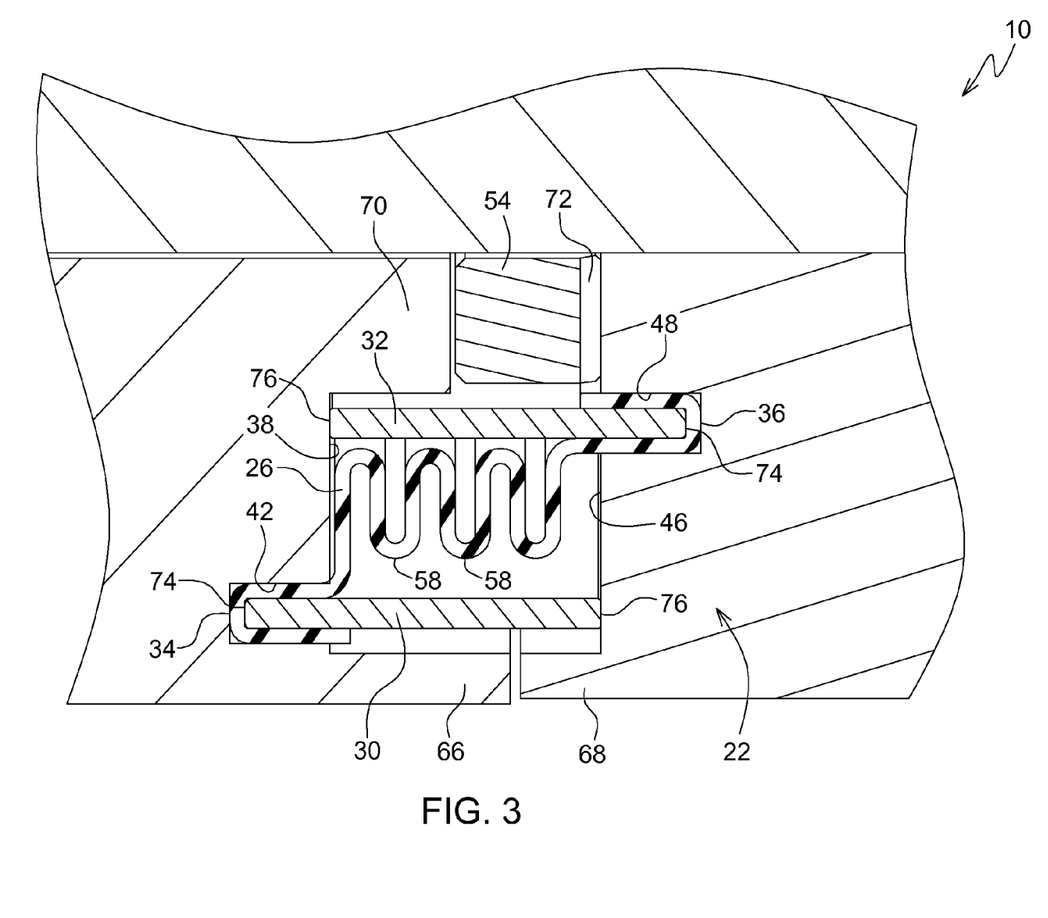
FIG. 3 is an enlarged view of a region A of FIG. 2, the region A being representative of each of the two seal units and associated areas of the cartridge joint.

Referring to FIGS. 2 and 3, the cartridge joint 10 has a pin 14, a first collar 16 circumferentially surrounding the pin 14 and fixed thereto, a second collar 18 circumferentially surrounding the pin 14 and fixed thereto, a bushing 20 positioned axially between the first collar 16 and the second collar 18 and circumferentially surrounding the pin 14 for relative rotation between the bushing 20 and the pin 14, and an annular first seal unit 22 and an annular second seal unit 24. Each of the seal units 22, 24 circumferentially surrounds the pin 14. The first seal unit 22 is positioned axially between the bushing 20 and the first collar 16 so as to establish a sealed connection therebetween and has an angularly flexible first convoluted seal 26 contacting the bushing 20 and the first collar 16. The second seal unit 24 is positioned axially between the bushing 20 the second collar 18 so as to establish a sealed connection therebetween and has an angularly flexible second convoluted seal 28 contacting the bushing 20 and the second collar 18.

Each of the seal units 22, 24 has a first lodging device 30 and a second lodging device 32. With respect to the first seal unit 22, the first lodging device 30 lodges a first end portion 34 of the first convoluted seal 26 against the bushing 20, and the second lodging device 32 lodges a second end portion 36 of the first convoluted seal 26 against the first collar 16. With respect to the second seal unit 24, the first lodging device 30 lodges a first end portion 34 of the second convoluted seal 28 against the bushing 20, and the second lodging device 32 lodges a second end portion of the second convoluted seal 28 against the second collar 18. As such, the first seal unit 22 has a lodging device lodging an end portion of the first convoluted seal 26 against the bushing 20 or the first collar 16, and the second seal unit 24 has a lodging device lodging an end portion of the second convoluted seal 28 against the bushing 20 or the second collar 18. Illustratively, each of the first and second lodging devices 30, 32 is a ring circumferentially surrounding the pin 14.

The bushing 20 has a first end face 38 facing in a first axial direction 104 and a second end face 40 facing in a second axial direction 106 opposite to the first axial direction 104. The first end face 38 has an annular first bushing groove 42, and the second end face 40 has an annular second bushing groove 44. The first collar 16 has an end face 46 with an annular first collar groove 48. The second collar 18 has an end face 50 with an annular second collar groove 52. With respect to the first seal unit 22, the first lodging device 30 wedges the first end portion 34 of the first convoluted seal 26 into the first bushing groove 42, and the second lodging device 32 wedges the second end portion 36 of the first convoluted seal 26 into the first collar 16 groove, as shown, for example, in FIG. 3. With respect to the second seal unit 24, the first lodging device 30 wedges the first end portion 34 of the second convoluted seal 28 into the second bushing groove 44, and the second lodging device 32 wedges the second end portion 36 of the second convoluted seal 28 into the second collar 18 groove.

With respect to the first seal unit 22, the first lodging device 30 contacts the first collar end face 46 and the second lodging device 32 contacts the first bushing end face 38, as shown, for example, in FIG. 3. With respect to the second seal unit 24, the first lodging device 30 contacts the second collar end face 50 and the second lodging device 32 contacts the second bushing end face 40 of the bushing 20. With respect to each of the first and second seal units 22, 24, the first lodging device 30 is positioned radially outward from the second lodging device 32.

The cartridge joint 10 has a first spacer ring 54 and a second spacer ring 56. The first spacer ring 54 is positioned axially between the bushing 20 and the first collar 16 and radially between the second lodging device 32 of the first seal unit 22 and the pin 14. The second spacer ring 56 is positioned axially between the bushing 20 the second collar 18 and radially between the second lodging device 32 of the second seal unit 24 and the pin 14.

The seals 26, 28 are angularly flexible to allow relative rotation between the bushing 20 and the two collars 16, 18. They are convoluted to accommodate such relative rotation. In the illustrated example of FIG. 3, they have radial convolutions 58 arranged axially relative to one another such that the convolutions 58 circumferentially surround the pin 14. The seals 26, 28 can angularly deform, or twist, in response to relative rotation between the bushing 20 and the collars 16, 18.

Figure 4:
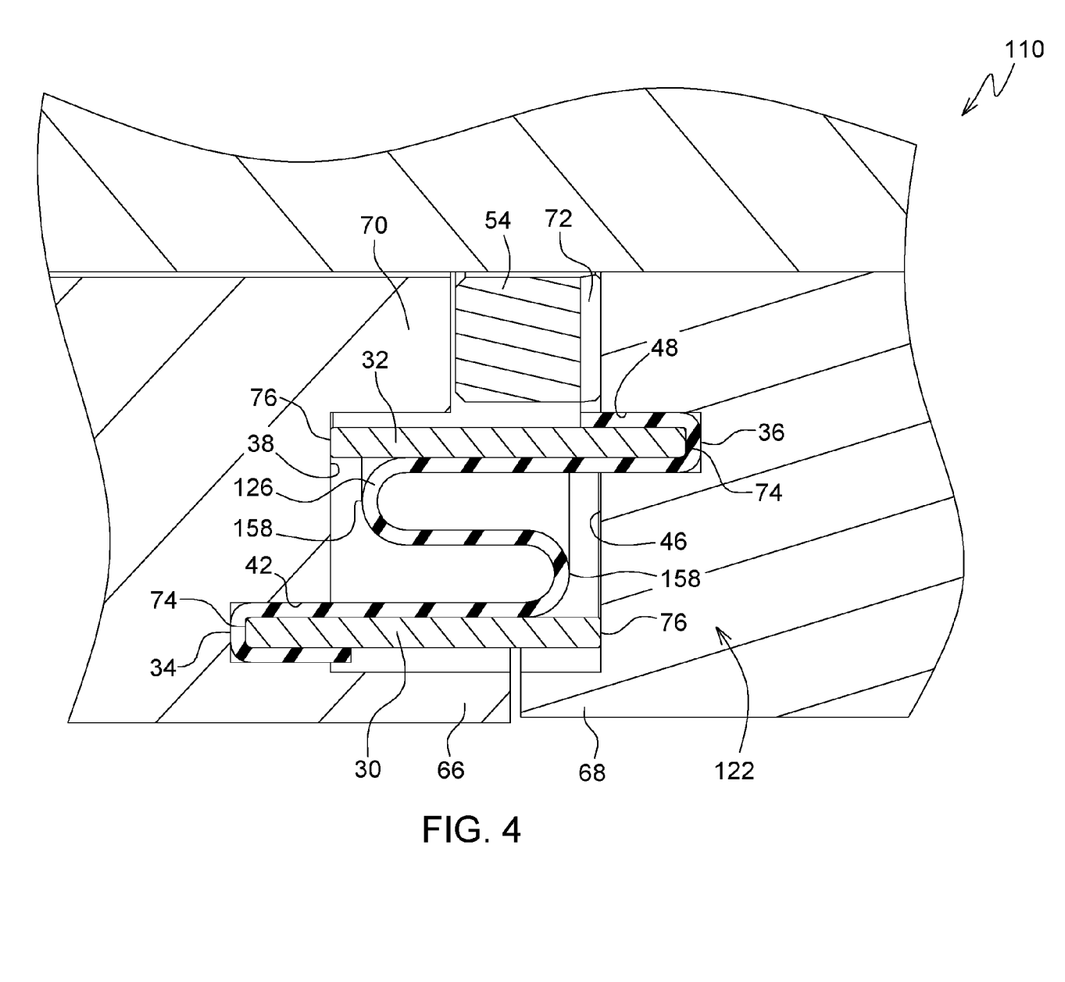
FIG. 4 is a view similar to FIG. 3 showing a convoluted seal of the cartridge joint configured in an alternative manner.

The seals 26, 28 may have a variety of convolution patterns. With respect to each seal 26, 28, in the embodiment of FIGS. 2 and 3, the convolutions 58 may extend radially, i.e., 90 degrees relative to the axis 12, as shown, for example, with respect to seal 26 in FIG. 3. In another embodiment, shown, for example, in FIG. 4, a cartridge joint 110 includes a first seal unit 122 which includes an angularly flexible first convoluted seal 126 with convolutions 158 that extend axially, i.e., 0 degrees relative to the axis 12, such that the convolutions 158 are arranged radially relative to one another. In yet other embodiments (not shown), axially successive convolutions may angle less and less relative to the axis 12. In a more specific example, the convolution immediately adjacent to the bushing 20 (the axially innermost convolution) may be oriented at 90 degrees, and the convolution immediately adjacent to the respective collar (the axially outermost convolution) may be oriented at 0 degrees or near 0 degrees, with axially successive convolutions from the axially innermost convolution and the axially outermost convolution angling less and less relative to the axis 12.

The seals 26, 28 are made of an elastomeric material. The seals 26, 28 may have a durometer (Shore A) between about 70 and about 80. The seals 26, 28 are made, for example, of nitrile.

The cartridge joint 10 is lubricated. The pin 14 has an internal, axially extending, blind lubricant reservoir 60 (e.g., drilled) and an end opening into the reservoir 60. The reservoir receives lubricant (e.g., hydraulic oil) via the end opening. The end opening is closed by a plug 62 (made, for example, of rubber) during use of the joint 10. A radial passageway 64 extends from the reservoir 60 to the radially outer surface of the pin 14 for lubrication of the internal load bearing surfaces of the cartridge joint 10, including the interface between the pin 14 and the bushing 20, between the pin 14 and the spacer rings 54, 56, between the spacer rings 54, 56 and the bushing 20, and between the spacer rings 54, 56 and the collars 16, 18.

The seal units 22, 24 block egress of lubricant from the cartridge joint 10 between the bushing 20 and the collars 16, 18, and block ingress of debris into the cartridge joint 10 between the bushing 20 and the collars 16, 18. The convoluted seals 26, 28 provide the main sealing function of the seal units 22, 24. The first lodging devices 30 provide a line of defense against debris ingress.

The seal units 22, 24 are positioned between a radially outer barrier and a radially inner barrier. The radially outer barrier is formed by an annular radially outer flange 66 of the bushing 20 and an annular radially outer flange 68 of a respective collar 16, 18, the flanges 66, 68 extending axially toward one another. The radially outer barrier blocks ingress of larger debris into the cartridge joint 10. The radially inner barrier is formed by an annular radially inner flange 70 of the bushing 20 and the respective spacer ring 54, 56.

The spacer rings 54, 56 space the bushing 20 and the collars 16, 18 from one another. Axial loads are taken up by the spacer rings 54, 56. The bushing 20, the collars 16, 18, and the pin 14 are made, for example, of steel (e.g., common heat-treated alloy steel), and the spacer rings 54, 56 are made, for example, of a hardened powdered metal (e.g., a ferrous material such as, for example, steel). The spacer rings 54, 56 are harder than the bushing 20, the collars 16, 18, and the pin 14. The spacer rings 54, 56 are, for example, heat treated so as to have a hardness level of hardness Rockwell C 50 or thereabout. Each spacer ring 54, 56 has one or more dimples 72 on a side face thereof (e.g., four dimples 72 spaced circumferentially evenly such that adjacent dimples are 90 degrees apart) allowing passage of lubricant through the one or more dimples 72 and around the spacer ring 54, 56 for lubrication between the spacer ring 54, 56 and the respective collar 16, 18 and between the spacer ring 54, 56 and the bushing 20.

The first and second lodging devices 30, 32 wedge or otherwise lodge the respective end portions 34, 36 of the convoluted seals 26, 28 into the respective grooves 42, 44, 48, 52 during assembly and operation of the cartridge joint 10. Each lodging device 30, 32 has a first end edge 74 positioned within a respective groove 42, 44, 48, 52, and an opposite second end edge 76 positioned outside the grooves 42, 44, 48, 52. During assembly, the second end edge 76 of each second lodging device 32 reacts against a respective end face 38, 40 of the bushing 20 so as to advance a second end portion 36 of the respective convoluted seal 26, 28 into the respective collar groove 48, 52. During operation, the interface between the second end edges 76 and the end faces 38, 40 of the bushing 20 may be lubricated, since the second lodging devices 32 are radially inward of the main body of the seals 26, 28.

The first and second lodging devices 30, 32 are made, for example, of a material softer than the bushing 20 and the collars 16, 18 so that, during use of the cartridge joint 10, the second end edges 76 of the lodging devices 30, 32 may wear somewhat due to relative rotation between the second end edges 76 and the adjacent harder bushing 20 or collar 16, 18. The lodging devices 30, 32 may be made, for example, of mild steel, brass, bronze, or a hard plastic, just to name a few examples.

The components of the cartridge joint 10 are assembled to form the cartridge joint 10. To assemble the cartridge joint 10, the first collar 16 is pressed onto the pin 14 in the second axial direction 106 as indicated by arrow 108 to a predetermined distance from a first end of the pin 14, such as the end with the end opening for lubricant. A first retainer clip 78 (e.g., circlip) is installed in a first groove of the radially outer surface of the pin 14 next to the first collar 16. The first spacer ring 54 is advanced onto the pin 14 from the second end of the pin 14 in the first axial direction 106.

The convoluted seals 26, 28 are mounted to the bushing 20. The first end portion 34 of each convoluted seal 26, 28 is generally U-shaped. The first lodging devices 30 are installed respectively in the U-shaped first end portions 34, and the first end portions 34 of the seals 26, 28 are advanced respectively into the bushing grooves 42, 44 by use of the first lodging devices 30 such that the first end portions 34 and the first lodging devices 30 are wedged respectively in the bushing grooves 42, 44 (by a light press operation using, for example, a hand vice or similar setup). The first lodging devices 30 thus force the first end portions 34 of the seals 26, 28 respectively into the bushing grooves 42, 44. The second end portion 36 of each convoluted seal 26, 28 is generally U-shaped. The second lodging devices 32 are installed respectively in the U-shaped second end portions 36 and respectively against the first and second end faces 38, 40 of the bushing 20 radially outward of the flange 70, in preparation for installation of the second end portions 36 into the collar grooves 48, 52.

The bushing 20 is installed on the pin 14. The bushing 20, with the seal units 22, 24 pre-assembled thereto, is advanced onto the pin 14 from the second end of the pin 14 toward the first collar 16 in the first axial direction 104 as indicated by arrow 110. In so doing, the second lodging device 32 of the first seal unit 22 reacts against the first end face 38 of the bushing 20 so that the second end portion 36 of the first seal 26 is advanced into the first collar groove 48 by use of the second lodging device 32 of the first seal unit 22 such that the second end portion 36 and the second lodging device 32 are wedged into the first collar 16 groove. The second lodging device 32 of the first seal unit 22 thus forces the second end portion 36 of the first seal 26 into the first collar groove 48, thereby essentially auto-assembling the first seal 26 to the first collar 16.

With the bushing 20 so installed, the second spacer ring 56 and the second collar 18 are installed on the pin 14. The second spacer ring 56 is advanced onto the pin 14 from the second end of the pin 14 in the first axial direction 104. The second collar 18 is then pressed onto the pin 14 from the second end of the pin 14, advancing it toward the bushing 20 in the first axial direction 104 as indicated by arrow 112. As the second collar 18 is advanced toward the bushing 20, the second lodging device 32 of the second seal unit 24 reacts against the second end face 40 of the bushing 20 so that the second end portion 36 of the second seal 28 and the second lodging device 32 of the second seal unit 24 are inserted and wedged into the second collar groove 52. The second lodging device 32 of the second seal unit 24 thus forces the second end portion 36 of the second seal 28 into the second collar groove 52, thereby essentially auto-assembling the second seal 28 to the second collar 18. A second retainer clip 80 (e.g., circlip) is installed in a second groove of the radially outer surface of the pin 14 next to the second collar 18.

On assembly of the cartridge joint 10, relative rotation is allowed between the bushing 20 and the pin 14 and between the bushing 20 and the two collars 16, 18. Being pressed onto the pin 14, the collars 16, 18 are fixed to the pin 14 against movement relative thereto. The spacer rings 54, 56 prevent contact between the bushing 20 and the collars 16, 18. The seal units 22, 24 establish sealed connections between the bushing 20 and the collars 16, 18.

The cartridge joint 10 is configured to allow limited rotation between the bushing 20 and the collars 16, 18. The convolutions 58 of the seals 26, 28 accommodate rotation between the bushing 20 and the collars 16, 18 but only so much rotation. Such a limited rotation joint 10 is useful in systems with limited pivoting between components. For example, a first component may be fixed to the two collars 16, 18 and a second component may be fixed to the bushing 20, allowing relative pivoting between the first and second components.

Figure 5:
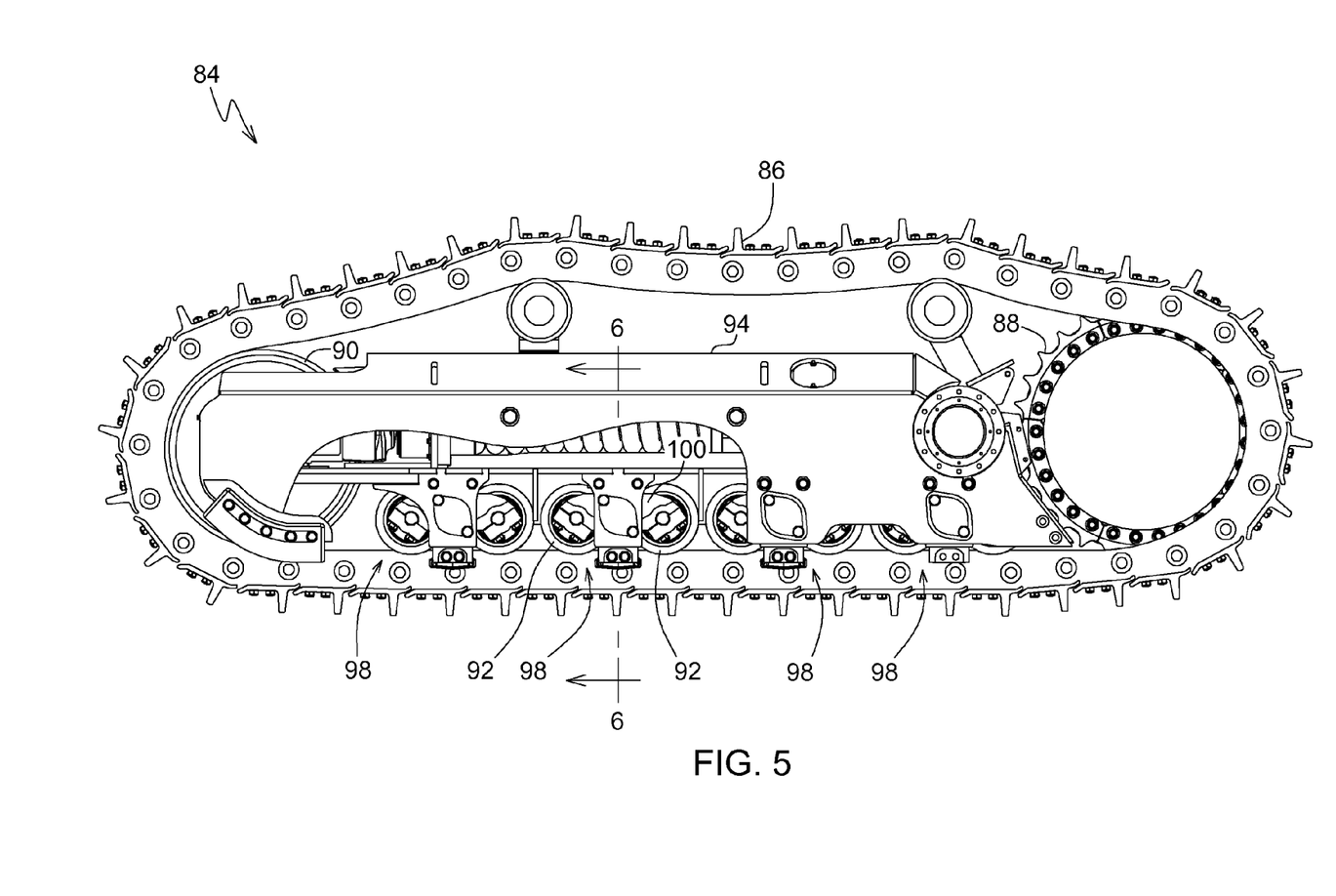
FIG. 5 is an elevational view showing a simplified track unit of an undercarriage.
Figure 6:
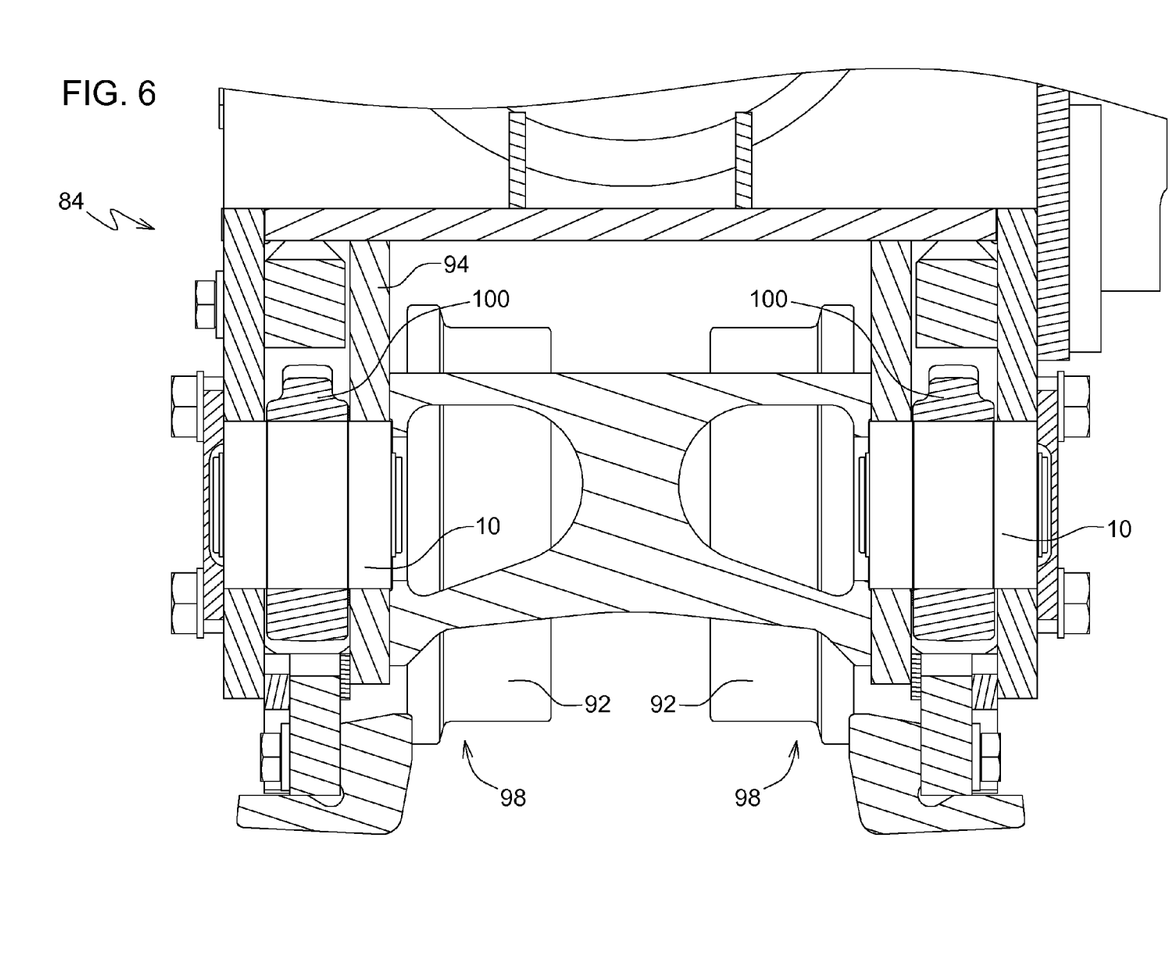
FIG. 6 is a sectional view taken along lines 6-6 of FIG. 5.

Referring to FIGS. 5 and 6, a track vehicle (crawler dozer, crawler loader, track excavator, etc.) has an undercarriage with one or more track units 84 on either side of the vehicle. Each track unit 84 has an endless track 86 (shown diagrammatically) trained about a drive sprocket 88 (e.g., at the rear), one or more idlers 90 (e.g., one at the front), and one or more lower track rollers 92 in contact with the low pass of the endless track 86 extending between the front and rear of the endless track 86. Each roller 92 may be mounted to and positioned under a track frame 94 (e.g., to which the sprocket may be rotatably coupled) or a recoil frame (to which an idler 90 may be rotatably coupled) coupled to the track frame 94 and recoilable relative thereto in response to, for example, ground impact forces.

In an example, a track roller bogie 98 includes a rocker arm 100 and two lower track rollers 92. The rocker arm 100 is coupled pivotally to the track frame 94 by use of a cartridge joint 10 allowing pivotal movement of the rocker arm 100 and the two rollers 92 coupled thereto relative to that frame about the axis 12 of the cartridge joint 10 (e.g., +/−10 degrees). With holes in the frame and the rocker arm 100 suitably aligned, a cartridge joint 10 may be pressed (e.g., lightly pressed) into a cartridge joint location, such that the first and second collars 16, 18 of that cartridge joint 10 are fixed to the frame 94, and the bushing 20 of that cartridge joint 10 is fixed to the rocker arm 100.

The outside diameters of the collars 16, 18 and the bushing 20 are slightly different from one another to facilitate insertion of the cartridge joints 10 into their locations. For example, the outside diameter of the second collar 18 is larger than the outside diameter of the bushing 20, and the outside diameter of the bushing 20 is larger than the outside diameter of the first collar 16.

A worn cartridge joint 10 may be replaced with a fresh cartridge joint 10 or have its worn components replaced (e.g., seal units 22, 24 or components thereof). To provide such service, the worn cartridge joint 10 may be removed from its location. A fresh cartridge 10 may then be installed in place of the worn cartridge 10, or the worn cartridge 10 may be disassembled as needed, have its worn components replaced or otherwise serviced, re-assembled, and re-inserted into its location.

The cartridge joint 10 is thus configured for limited relative rotation between the bushing 20 and the collars 16, 18 (e.g., +/−10 degrees), for corresponding limited relative rotation between the respective components of the track roller bogie 98. Each convoluted seal 26, 28 accommodates such limited relative rotation by angular deformation, or twisting, of the seal 26, 28. The seal units 22, 24, with their convoluted seals 26, 28, provide the sealing function for the limited rotation cartridge joint 10, in a relatively cost effective manner.

As alluded to above, the radially outer first lodging devices 30 are inserted into the respective radially outer bushing grooves 42, 44 of the bushing 20, whereas the radially inner second lodging devices 32 are inserted into the respective radially inner collar grooves 48, 52 of the collars 16, 18 ("first lodging arrangement"). Alternatively, the inverse may be employed in which the radially outer first lodging devices 30, and corresponding seal end portions 36, may be inserted into respective radially outer grooves of the collars 16, 18, and the radially inner second lodging devices 32, and corresponding seal end portions 34, may be inserted into respective radially inner grooves of the bushing 20 ("second lodging arrangement"). The first lodging arrangement is preferred over the second lodging arrangement since the bushing 20 is considered to have a greater load bearing capacity than either of the collars 16, 18 due to its greater axial width than that of the collars 16, 18.

The cartridge joint 10 may be useful in other non-undercarriage pivot joint 10 applications. For example, the cartridge joint 10 may be used with various linkages of crawler loaders and four-wheel-drive loaders (e.g., loader bucket-to-boom joints).

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A cartridge joint, comprising
a pin,
a first collar circumferentially surrounding the pin and fixed thereto,
a second collar circumferentially surrounding the pin and fixed thereto,
a bushing positioned axially between the first collar and the second collar and circumferentially surrounding the pin for relative rotation between the bushing and the pin, and
an annular first seal unit and an annular second seal unit each of which circumferentially surrounds the pin, the first seal unit positioned axially between the bushing and the first collar so as to establish a sealed connection therebetween and comprising an angularly flexible first convoluted seal contacting the bushing and the first collar, the second seal unit positioned axially between the bushing and the second collar so as to establish a sealed connection therebetween and comprising an angularly flexible second convoluted seal contacting the bushing and the second collar;
wherein each of the first and second seal units comprises a first lodging device and a second lodging device, with respect to the first seal unit the first lodging device lodges a first end portion of the first convoluted seal against the bushing and the second lodging device lodges a second end portion of the first convoluted seal against the first collar, and with respect to the second seal unit the first lodging device lodges a first end portion of the second convoluted seal against the bushing and the second lodging device lodges a second end portion of the second convoluted seal against the second collar.

2. The cartridge joint of claim 1, wherein each of the first and second convoluted seals is made of an elastomer.

3. The cartridge joint of claim 1, wherein each of the first and second convoluted seals is made of nitrile.

4. The cartridge joint of claim 1, wherein each of the first and second convoluted seals comprises convolutions arranged axially relative to one another, and the convolutions circumferentially surround the pin.

5. The cartridge joint of claim 1, wherein each of the first and second convoluted seals comprises convolutions arranged radially relative to one another, and the convolutions circumferentially surround the pin.

6. The cartridge joint of claim 1, wherein each of the first and second lodging devices is a ring circumferentially surrounding the pin.

7. The cartridge joint of claim 6, wherein the bushing comprises a first end face and a second end face, the first end face comprises an annular first bushing groove, the second end face comprises an annular second bushing groove, the first collar comprises an end face comprising an annular first collar groove, the second collar comprises an end face comprising an annular second collar groove, with respect to the first seal unit the first lodging device wedges the first end portion of the first convoluted seal into the first bushing groove and the second lodging device wedges the second end portion of the first convoluted seal into the first collar groove, and with respect to the second seal unit the first lodging device wedges the first end portion of the second convoluted seal into the second bushing groove and the second lodging device wedges the second end portion of the second convoluted seal into the second collar groove.

8. The cartridge joint of claim 7, wherein with respect to the first seal unit the second lodging device contacts the first end face of the bushing, and with respect to the second seal unit the second lodging device contacts the second end face of the bushing.

9. The cartridge joint of claim 7, wherein with respect to each of the first and second seal units the first lodging device is positioned radially outward from the second lodging device.

10. The cartridge joint of claim 9, further comprising a first spacer ring and a second spacer ring, the first spacer ring is positioned axially between the bushing and the first collar and radially between the second lodging device of the first seal unit and the pin, and the second spacer ring is positioned axially between the bushing the second collar and radially between the second lodging device of the second seal unit and the pin.

11. The cartridge joint of claim 1, wherein the cartridge joint is included in a track roller bogie.

12. A method of assembling a cartridge joint, the cartridge joint comprising a pin, a bushing, a first collar, a second collar, a first seal unit, and a second seal unit, the method comprising:

lodging a first end portion of an angularly flexible first convoluted seal of the first seal unit into the bushing with a first lodging device of the first seal unit and a second end portion of the first convoluted seal into the first collar, circumferentially surrounding the pin and fixed thereto, with a second lodging device of the first seal unit by reacting the second lodging device of the first seal unit against a first end face of the bushing upon installing the bushing in a position circumferentially surrounding the pin for relative rotation between the bushing and the pin, and     lodging a first end portion of an angularly flexible second convoluted seal of the second seal unit into the bushing with a first lodging device of the second seal unit and a second end portion of the second convoluted seal against a second collar with a second lodging device of the second seal unit by reacting the second lodging device of the second seal unit against a second end face of the bushing upon installing the second collar in a position circumferentially surrounding the pin in fixed relation thereto such that the bushing is positioned axially between the first and second collars.

13. The method of claim 12, wherein the lodging of the first convoluted seal comprises wedging the first end portion of the first convoluted seal into a first groove of the bushing with the first lodging device of the first seal unit and the second end portion of the first convoluted seal into a groove of the first collar with the second lodging device of the first seal unit, and the lodging of the second convoluted seal comprises wedging the first end portion of the second convoluted seal into a second groove of the bushing with the first lodging device of the second seal unit and the second end portion of the second convoluted seal into a groove of the second collar with the second lodging device of the second seal unit.

14. The method of claim 12, wherein each of the first and second lodging devices is a ring.

\* \* \* \* \*